United States Patent [19]

Nishikata

[11] 4,077,129

[45] Mar. 7, 1978

[54] PORTABLE, LIGHTWEIGHT MEASURING INSTRUMENT

[75] Inventor: Goro Nishikata, Kawasaki, Japan

[73] Assignee: Kabushiki Kaisha Mitutoyo Seisakusho, Tokyo, Japan

[21] Appl. No.: 720,699

[22] Filed: Sep. 7, 1976

[30] Foreign Application Priority Data

Dec. 29, 1975  Japan ............................. 50/178780

[51] Int. Cl.² .............................................. G01B 5/02
[52] U.S. Cl. ............................... 33/147 T; 33/143 M; 33/169 B; 33/172 R
[58] Field of Search ............. 33/143 M, 143 J, 143 K, 33/147 T, 147 J, 169 B, 172 R

[56] References Cited

U.S. PATENT DOCUMENTS

| | | | |
|---|---|---|---|
| 2,303,858 | 12/1942 | Ostberg | 33/169 B |
| 2,846,769 | 8/1958 | Colont | 33/147 T |
| 3,447,244 | 6/1969 | Scholl | 33/147 T |
| 3,803,719 | 4/1974 | Nishina | 33/172 R |
| 3,945,121 | 3/1976 | Uchino | 33/147 T |

FOREIGN PATENT DOCUMENTS

| | | | |
|---|---|---|---|
| 1,354,153 | 1/1964 | France | 33/143 K |
| 489,774 | 7/1970 | Switzerland | 33/147 T |

Primary Examiner—Richard E. Aegerter
Assistant Examiner—Richard R. Stearns
Attorney, Agent, or Firm—Brisebois & Kruger

[57] ABSTRACT

A portable, lightweight measuring instrument comprising a main beam and a slider which are relatively displaced to carry out a measurement, a counter which indicates the relative displacement between said main beam and said slider by rack-and-pinion combination, and a dial gauge separate from said counter, both said counter and said dial gauge being mounted on said slider.

10 Claims, 12 Drawing Figures

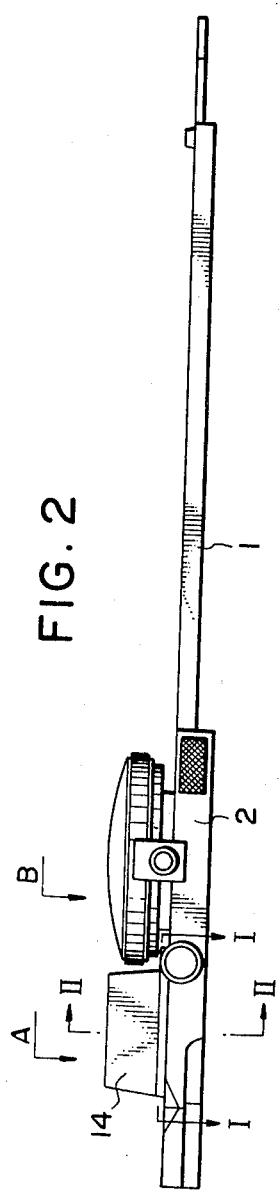
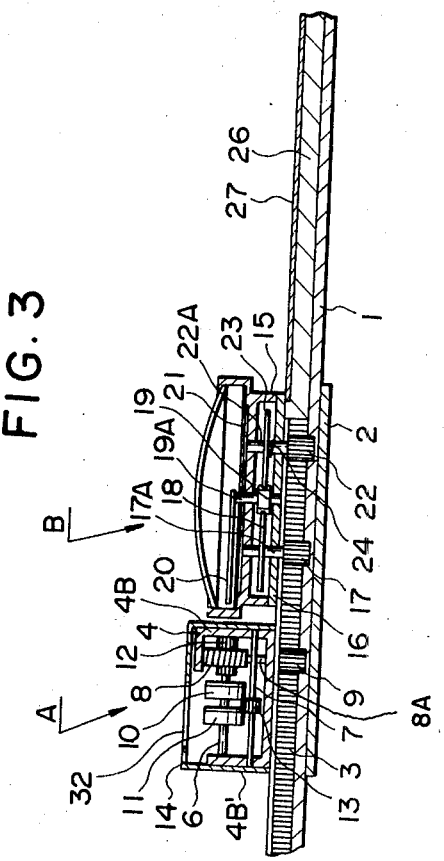

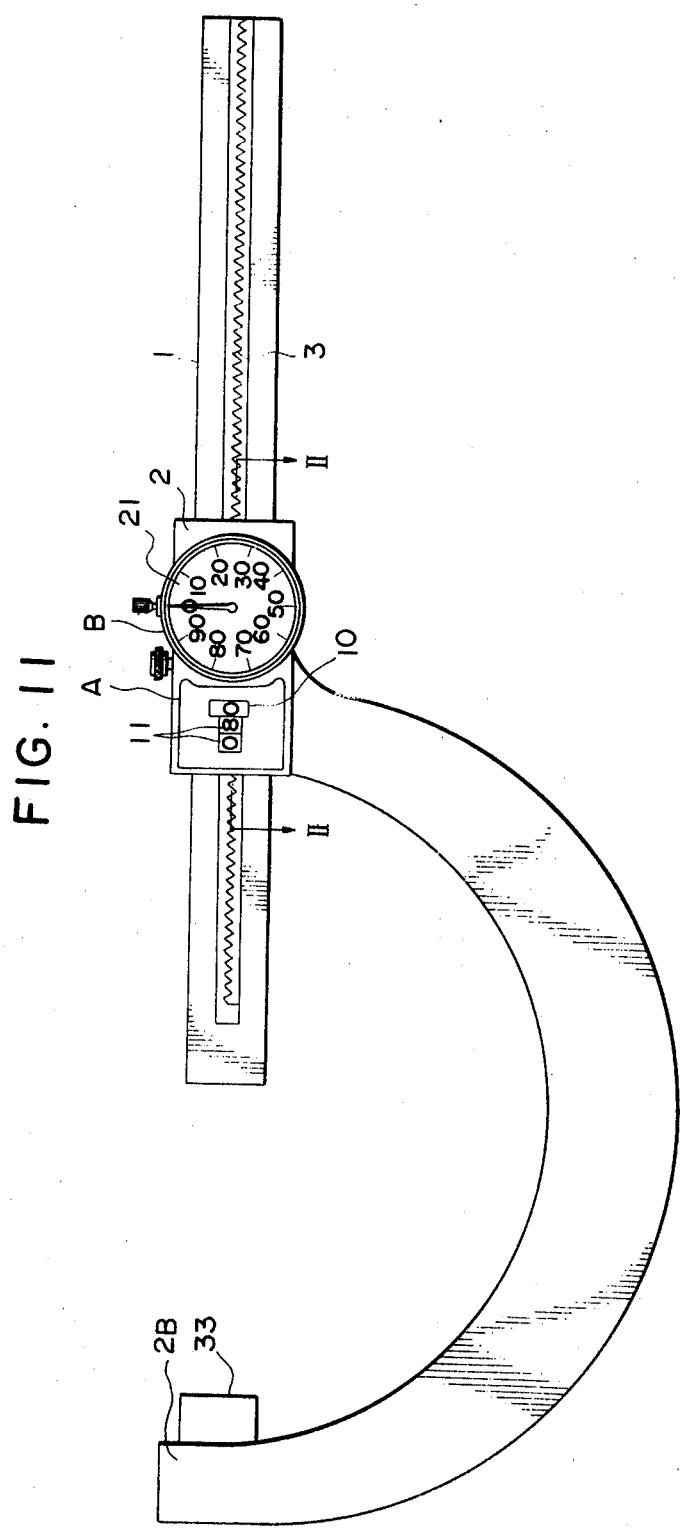

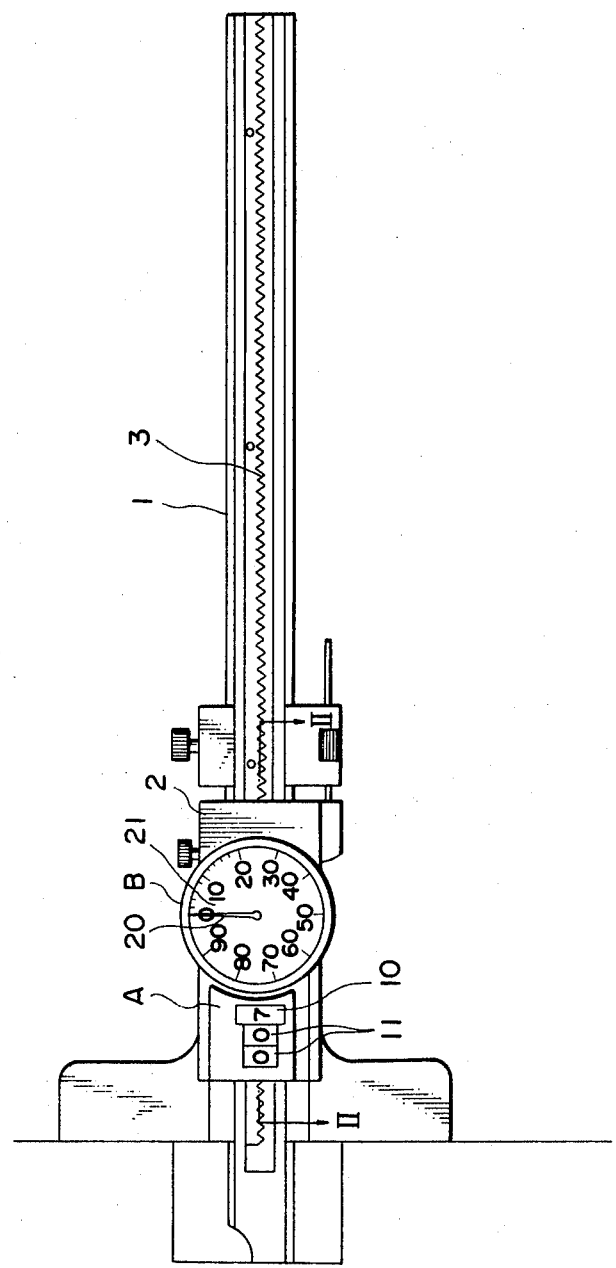

PORTABLE, LIGHTWEIGHT MEASURING INSTRUMENT

BACKGROUND OF THE INVENTION

The present invention relates to a portable, lightweight measuring instrument which uses the combination of a counter and a dial gauge to indicate the relative displacement between a main beam and a slider.

The conventional measuring instruments characterized by portability, small size and light weight which measure the relative displacement between a main beam and a slider include micrometers, height gauges, vernier calipers, depth gauges, etc.

In the case of vernier calipers, the intersection of the main scale on the main beam and the vernier scale on the slider is read off by the naked eyes and an error is liable to occur in the reading. Moreover, the minimum digit is read by the measurers feel and it is impossible to thereby avoid reading errors. To eliminate this inconvenience, a dial gauge is employed to read the minimum digit as enlarged, but in this case the upper digits are read at the intersection of the scales. Thus visual reading errors remain unavoidable. The same thing may be said about the other instruments, i.e., micrometers, height gauges, depth gauges, etc.

The present invention, which aims at elimination of this inconvenience, is characterized in that a counter for indication to the first decimal point and a dial gauge for indication to the second decimal point and thereafter are provided separately; both said counter and said dial gauge are mounted on the slider; both said counter and said dial gauge are used to indicate the measurement.

SUMMARY OF THE INVENTION

The first object of the present invention is to provide a small, portable, lightweight measuring instrument for indicating the relative displacement between a main beam and a slider by means of a counter and a separate dial gauge.

The second object of the present invention is to provide a portable, lightweight measuring instrument characterized in that the counter is adjustably mounted on the slider, thereby facilitating the adjustment of the counter to zero.

The third object of the present invention is to provide a measuring instrument in which the counter and the dial gauge mounted on the slider have their respective pinions simultaneously in mesh with a single rack and said counter and said dial gauge are spaced longitudinally along said rack.

The fourth object of the present invention is to provide a measuring instrument in which the upper digits are indicated on the counter and the minimum digit is indicated on the dial gauge in enlarged form.

The fifth object of the present invention is to provide a measuring instrument in which the counter cover is slantingly installed so that the measured object will not touch any corner of the counter cover.

The sixth object of the present invention is to provide a measuring instrument in which the top of the protective cover for the dial gauge and the top of the counter cover are located in approximately the same plane.

Several other object of the present invention will become apparent from the following detailed account of several embodiments thereof, with reference to the attached drawings, in which:

FIG. 2 is a side view of the calipers shown in FIG. 1.

FIG. 3 is a partial longitudinal sectional view showing the relationship between the counter, the dial gauge, the rack, the depth rod, the rack cover, etc., the relationship between the counter, the dial gauge and the rack being the same as that in a section taken along the line II—II in FIGS. 10, 11 and 12.

FIG. 11 is a front view of an embodiment of the present invention in the form of a micrometer.

FIG. 12 is a front view of an embodiment of the present invention in the form of depth-measuring vernier calipers.

The following is a description of the present invention as applied to vernier calipers.

Figure 1:
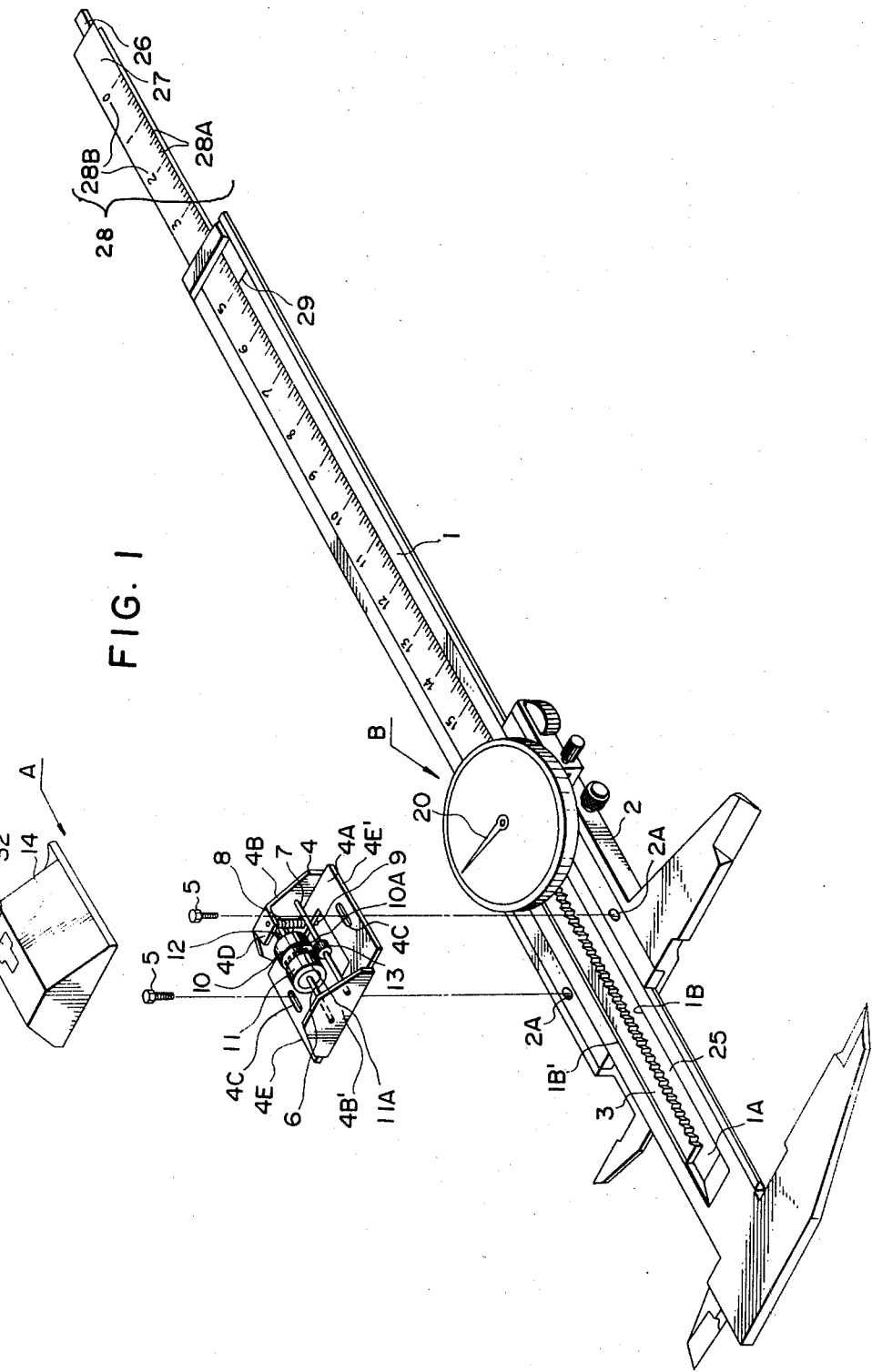
FIG. 1 is a partially exploded oblique view of one embodiment of the present invention in the form of vernier calipers.

In FIGS. 1-3, the slider 2, which may be a long and narrow plate is slidably fitted onto the main beam 1 to slide longitudinally thereof. A longitudinal central rack groove 1A is cut in the main beam 1 and a rack 3 within said rack groove 1A is adapted to slide longitudinally therein.

The slider 2 carries a digital counter A and a separate digital dial gauge.

The counter A is made by stamping a single metal plate to an appropriate shape, bending said metal plate inwardly at three spots and shaping it into an approximately U-shaped support frame 4. At the base 4A of said support frame 4, which contacts the slider 2, are a pair of mounting slots 4C, 4C extending longitudinally of the rack 3. Small screws 5, 5, as indicated in FIG. 1, are introduced into said slots 4C, 4C and screwed into the screw holes 2A, 2A formed on the top surface of the slider 2, thereby attaching the slider 2 to the support frame 4. Since the slots 4C, 4C extend in the longitudinal direction of the rack 3, the support frame 4 can be displaced relative to the slider 2 longitudinally of the rack 3 by loosening the small screws 5, 5, so as to permit independent zero adjustment of the counter A. Between the opposed members 4B, 4B' of said support frame 4 the counter shaft 6 and the pinion shaft 7 lie parallel to each other and extend longitudinally of the rack 3. Between the base 4A (which is perpendicular to said members 4B, 4B') and the flange 4D at the upper end of said member 4B a worm screw 8 is rotatably supported on a shaft 8A which passes between said counter shaft 6 and the pinion shaft 7 and projects through the base 4A into the rack groove 1A. The counter pinion 9 is mounted on the end of the shaft 8A and meshes with said rack 3.

A wheel 10 for indication of the first decade and a wheel 11 for indication of subsequent decades are rotatably mounted on the counter shaft 6. A worm wheel 12 meshing with said worm 8 is supported on the counter shaft 6, and the worm wheel 12 and wheel 10 are fixed to rotate together. A digit-raising pinion 13 is rotatably supported on the pinion shaft 7. The digit-raising pinion 13 is located between the wheels 10 and 11 and meshes with the side tooth 11A of the wheel 11, so that for every full turn of the wheel 10 the digit-raising tooth 10A on the side of the dial wheel 10 engages the digit-raising pinion 13 to turn the digit-raising pinion 13 by one tooth, advancing the wheel 11 and digitally indicating the measured result by the numerals provided on the wheels 10, 11. In this case, as the support frame 4 is displaced relative to the slider 2 longitudinally of the rack 3, the pinion 9 can be turned to adjust the wheels 10, 11, to zero.

Figure 4:
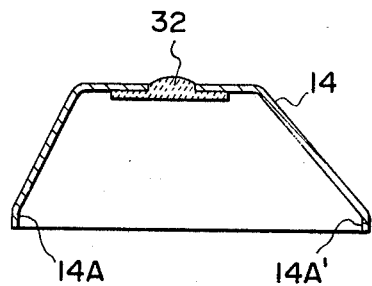
FIG. 4 is a sectional view taken through the counter cover along the line I—I in FIG. 2.
Figure 5:
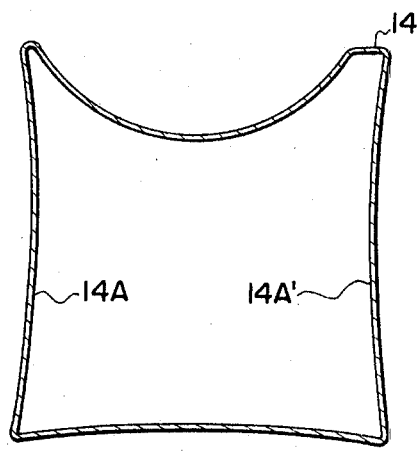
FIG. 5 is a sectional view taken through the counter cover along the line II—II in FIG. 2.

A counter cover 14, open at its bottom is fitted onto said support frame 4. Thus, in the illustrated embodiment, the counter cover 14 is trapezoidal in section. As shown in FIGS. 4, 5 the opposed edges 14A, 14A' of the open face of the counter cover 14 are inwardly bent in an arc; the minimum width between said open edges 14A, 14A' is made slightly smaller than the width between the sides 4E, 4E' of the base 4A of the support frame 4 in FIG. 1; the open edges 14A, 14A' are made to fit the sides 4E, 4E' of the base 4A; and using the frictional force developed between the open edges 14A, 14A' and the sides 4E, 4E' of the base 4A, the counter cover 14 is fitted to the support frame 4.

Next the dial gauge B fitted to the slider 2 as a separate unit from the counter A is to be described. As illustrated in FIG. 3, the cover 16 of the dial gauge frame 15 is directly attached to the slider 2 adjacent to said counter A. The shaft 17A of the second pinion 17 is rotatably mounted between said frame 15 and said cover 16. The second pinion 17 meshes with the rack 3, and an intermediate gear 18 is fixed to the shaft 17A. Moreover, the shaft 19A of a drive gear 19 is rotatably supported between the dial gauge frame 15 and the cover 16. The drive gear 19 meshes with the intermediate gear 18, and a pointer 20 is fixed to the shaft 19A. A scale 21 is rotatably mounted on the top surface of the dial gauge frame 15 so that it may be adjusted to an arbitrary angle. Thus the torque of the second pinion 17 is transmitted to the intermediate gear 18 and in consequence the pointer 20 indicates the measured result on the dial 21 of the dial gauge frame 15.

The shaft 22A of the third pinion 22 is rotatably supported between the dial gauge frame 15 and the cover 16. The third pinion 22 meshes with the rack 3. A spur gear 23 is rotatably supported on said shaft 22A and this gear meshes with the drive gear 19. A spring 24 is inserted between the spur gear 23 and the third pinion 22, one end of the spring being fixed to said spur gear 23 and its other end to said third pinion 22, so that backlashes between the intermediate gear 18 and the drive gear 19 and between the second pinion 17 and the rack 3 are eliminated.

The turning ratio between the shaft 19A and the dial wheel 10 is set such that upon every full turn of the shaft 19A driving the pointer 20 the numerals on the wheel 10 of the counter can be changed one digit. The wheel 10 indicates the measurement to the first decimal point, while the pointer 20 provides an enlarged indication of the second decimal point and thereafter on the scale 21.

For zero adjustment of the dial gauge B, the scale 21 is turned relative to the pointer 20 to match the numeral "zero" on scale 21 to the pointer 20.

The indicating surfaces of the counter A and the dial gauge B lie in the same plane so that they can be housed conveniently and any visual error in reading the indication can be prevented.

Within the space 25 which extends longitudinally of the slider 2 between side 1B of the rack groove 1A and the rack 3, a depth rod 26 is slidably seated. One end of the depth rod is fixed to the cover 16 of the dial gauge B. A slender rack cover 27 within the rack groove 1A between the sides 1B, 1B' of that groove is fixed to the depth rod 26 to cover the rack 3. On this rack cover 27 is a longitudinal auxiliary scale 28 composed of the scale lines 28A and the numerals 28B, while at the end of the main beam 1 is provided an index line 29. Thus from a scale line 28A and the index line 29 the first decimal point and the upper digits can be read. The numerals 28B are arranged in an increasing order from the end to the dial gauge B.

Figure 6:
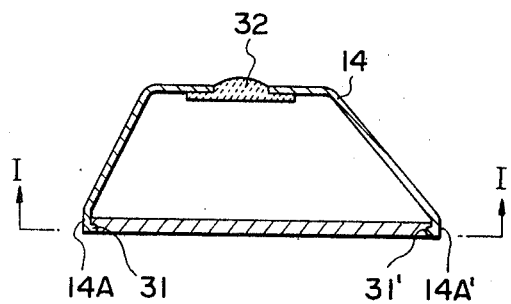
FIG. 6 is a sectional view taken through the counter cover in another embodiment of the invention.
Figure 7:
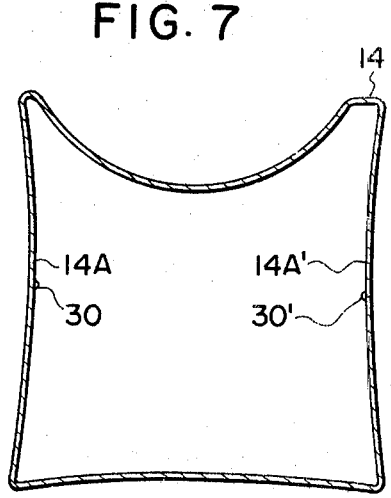
FIG. 7 is a sectional view taken through the counter cover along the line I—I in FIG. 6.
Figure 10:
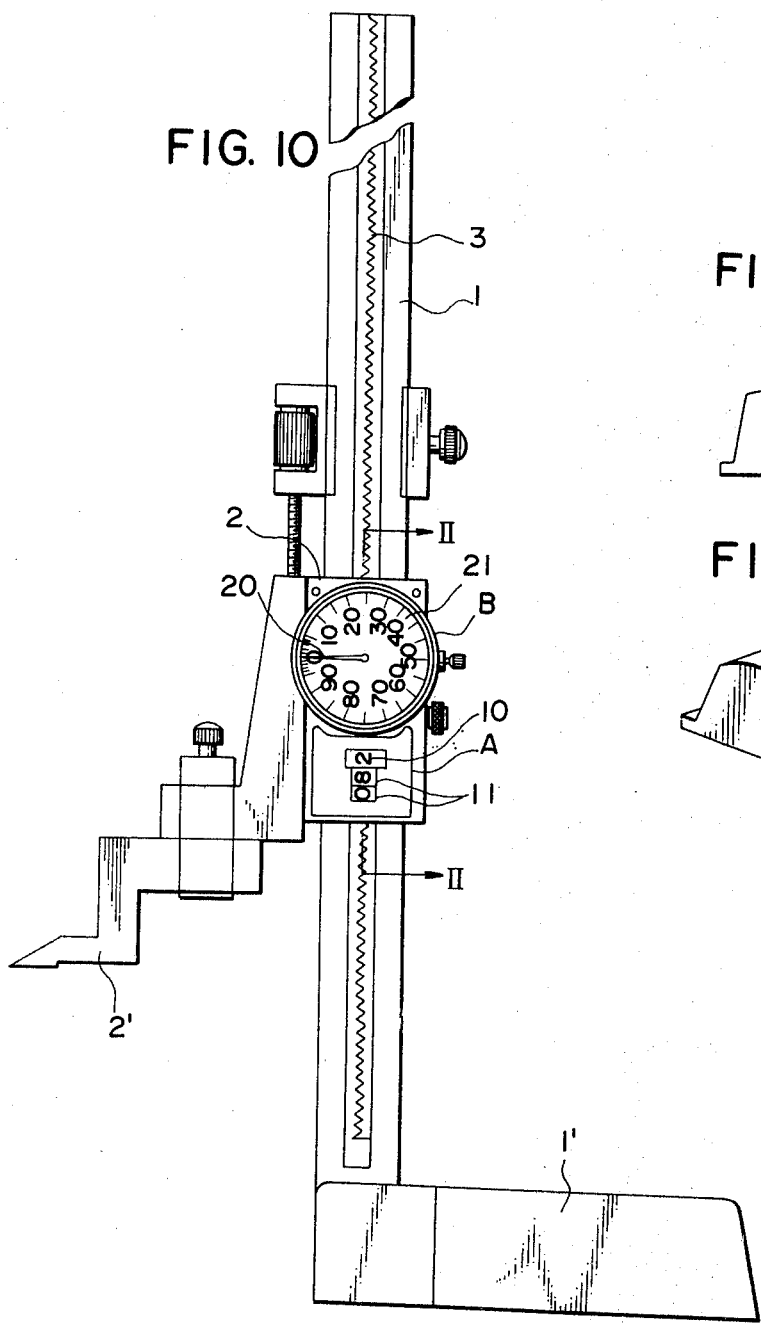
FIG. 10 is a front view of an embodiment of the present invention in the form of a height gauge.

In the above embodiment the counter cover 14 is held on the support frame 4 by only the frictional force developed between the edges 14A, 14A' and the sides 4E, 4E' of the base 4. This arrangement, however, is not the only possibility; it may be so arranged that, as illustrated in FIGS. 6 and 7, the projections 30, 30' are formed centrally on the inside of each of the edges 14A, 14A'. The recesses 31, 31' to receive said projections 30, 30' are provided on the sides 4E, 4E' of the support frame 4, so that the mounting and removal of the counter cover 14 can be controlled by the projections 30, 30' which fit into the recesses 31, 31'; or conversely, the projections may be formed on the support frame 4, while said recesses may be provided on the counter 14; or the sides 4E, 4E' of the support frame 4 may be inclined slightly inward to the slider 2, thereby forming a dovetail section of the sides 4E, 4E', with edges to fit the inclined sides provided on the rack cover 14.

Figure 8:
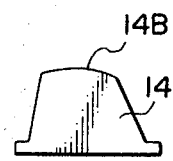
FIG. 8 is a side view showing another shape of the counter cover than the one illustrated in FIGS. 1-7.
Figure 9:
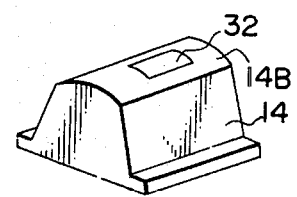
FIG. 9 is a perspective view of the counter cover illustrated in FIG. 8.

The above-mentioned counter cover 14 is trapezoidal in shape but its top 14B may be formed in an arc as illustrated in FIGS. 8, 9, where 32 indicates a transparent reading window provided in the counter cover 14.

The foregoing is an example of the present invention as applied to vernier calipers but the invention may be applied to other devices as well. For example, the present invention may be applied to a height gauge in which the slider 2 carrying a measuring member 2' is vertical and slidably supported on the main beam 1 which rises upright from the base 1', so that an object is measured between the base plane upon which the base 1' rests and the measuring member 2' of the slider 2. Alternatively, it may be applied to a micrometer in which, as indicated in FIG. 11, a U-shaped frame 2B is provided on the slider 2, and in which an object is measured by using the anvil 33 attached to frame 2B and the main beam 1 slidably retained in the slider 2. It may also be applied to depth vernier calipers as illustrated in FIG. 12. In other words the present invention may be applied to any measuring instrument, provided it works on the principle of moving a slider 2 longitudinally with respect to a main beam 1 and reading the displacement of the slider 2. In each embodiment the structures of the dial gauge B and the counter A are as shown in FIG. 3 and accordingly their description is omitted.

As described above, in the measuring instrument according to the present invention, the counter which indicates the measured result by means of wheels, and the dial gauge in which the pointer indicates the measured result on the scale of the dial gauge frame, are provided as separate units, thereby facilitating their attachment to the slider. Moreover, the support frame of the counter is made of a single plate and the counter is adjustably attached through mounting slots therein to the slider, thereby facilitating the assembly of the counter; and in attaching the counter the support frame can be shifted in the sliding direction of the slider, thereby enabling simple, quick zero adjustment of the counter. These features make it possible to measure an object accurately without any reading error due to improper attachment of the counter.

When the opposed edges of the counter cover are made resilient to hold the counter cover on elastically, the counter cover may be easily attached and removed, thus facilitating assembly in mass production and internal inspection and repair with the counter cover readily removed. If projections are provided either on the open edges of the counter cover or on the support frame and corresponding recesses provided either on the support frame or on the edges of the counter cover so that they interfit, the attachment and removal of the counter cover will be reliably controlled.

And if the width of the counter cover is decreased toward the reading window, the measurement will be made with reduced possibility of the counter cover hitting an object to be measured.

And if in vernier calipers an auxiliary scale for reading the indication over the first decimal point is solidly attached to the slider, failure of the counter will not hamper the measurement of indication over the first decimal point.

We claim:

1. A portable, lightweight measuring instrument comprising:
   a. a main beam;
   b. a slider mounted to slide longitudinally of said main beam;
   c. a rack extending longitudinally along said main beam;
   d. a dial gauge attached to said slider, said dial gauge having a pointer driven by a first pinion meshing with said rack to indicate a portion of the displacement of said slider relative to said main beam, said dial gauge including dial means rotatable relative to the pointer for adjusting the dial gauge to zero; and
   e. a counter separate from said dial gauge attached to said slider and driven by a second pinion meshing with said rack to indicate an additional portion of the displacement of the slider relative to the beam, so that the total displacement of the slider is indicated by the dial gauge and counter, said counter being attached to said slider for zero adjustment by means attaching the counter to the slider for longitudinal adjustment with respect to the slider.

2. A measuring instrument as claimed in claim 1, wherein the largest digits are indicated on the counter and the smallest digit is indicated by the dial gauge on an enlarged scale.

3. A measuring instrument as claimed in claim 1, wherein the counter and the dial gauge each project essentially the same distance from said slider.

4. A measuring instrument as claimed in claim 1, wherein the counter has a cover of decreasing width in a direction toward the indicating surface of the counter.

5. A measuring instrument as claimed in claim 1, wherein said rack comprises a single rack on the main beam of a vernier caliper; and said slider comprises the slider of the vernier caliper.

6. A measuring instrument as claimed in claim 1, wherein said rack comprises a rack on the main beam of a height gauge; and said slider comprises the slider of the height gauge.

7. A measuring instrument as claimed in claim 1, wherein said slider comprises a U-shaped slider with a measuring member of a micrometer which measures an object inserted between the measuring member of the slider and the main beam.

8. A measuring instrument as claimed in claim 1, wherein said rack comprises a rack on the main beam of depth vernier calipers.

9. A measuring instrument as claimed in claim 1 wherein, said counter includes a base having longitudinally extending slots, and said means attaching the counter to the slider comprises screws extending through the slots and into the slider.

10. A measuring instrument as claimed in claim 1 wherein said counter and said dial gauge are attached to said slider in side by side relation, said counter and dial gauge each having indicating surfaces in a common plane parallel to the main beam.

* * * * *